United States Patent
Bacchiani et al.

(10) Patent No.: US 9,620,145 B2
(45) Date of Patent: Apr. 11, 2017

(54) CONTEXT-DEPENDENT STATE TYING USING A NEURAL NETWORK

(71) Applicant: Google Inc., Mountain View, CA (US)

(72) Inventors: Michiel A. U. Bacchiani, Summit, NJ (US); David Rybach, New York, NY (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/282,655

(22) Filed: May 20, 2014

(65) Prior Publication Data

US 2015/0127327 A1 May 7, 2015

Related U.S. Application Data

(60) Provisional application No. 61/899,085, filed on Nov. 1, 2013.

(51) Int. Cl.

| | |
|---|---|
| *G10L 15/16* | (2006.01) |
| *G10L 25/30* | (2013.01) |
| *G10L 15/26* | (2006.01) |
| *G10L 15/06* | (2013.01) |
| *G10L 15/22* | (2006.01) |
| *G10L 15/183* | (2013.01) |

(52) U.S. Cl.
CPC .............. *G10L 25/30* (2013.01); *G10L 15/06* (2013.01); *G10L 15/16* (2013.01); *G10L 15/183* (2013.01); *G10L 15/22* (2013.01); *G10L 15/26* (2013.01)

(58) Field of Classification Search
None
See application file for complete search history.

(56) References Cited

U.S. PATENT DOCUMENTS

| | | |
|---|---|---|
| 5,150,449 A | 9/1992 | Yoshida et al. |
| 5,542,006 A | 7/1996 | Shustorovich et al. |
| 5,600,753 A | 2/1997 | Iso |
| 6,397,179 B2 | 5/2002 | Crespo et al. |
| 7,844,466 B2 | 11/2010 | Roy |
| 8,965,112 B1 | 2/2015 | Ibarz et al. |
| 2012/0065976 A1 | 3/2012 | Deng et al. |
| 2013/0138436 A1* | 5/2013 | Yu ........................... G06N 3/08 704/232 |
| 2013/0225128 A1 | 8/2013 | Gomar |

(Continued)

OTHER PUBLICATIONS

Dahl et al "Context-Dependent Pre-Trained Deep Neural Networks for Large-Vocabulary Speech Recognition", IEEE, Trans. ASLP vol. 20 No. 1, Jan. 2012.*

(Continued)

*Primary Examiner* — Jialong He
*Assistant Examiner* — Yi-Sheng Wang
(74) *Attorney, Agent, or Firm* — Fish & Richardson P.C.

(57) ABSTRACT

The technology described herein can be embodied in a method that includes receiving an audio signal encoding a portion of an utterance, and providing, to a first neural network, data corresponding to the audio signal. The method also includes generating, by a processor, data representing a transcription for the utterance based on an output of the first neural network. The first neural network is trained using features of multiple context-dependent states, the context-dependent states being derived from a plurality of context-independent states provided by a second neural network.

19 Claims, 7 Drawing Sheets

(56) References Cited

U.S. PATENT DOCUMENTS

| | | | |
|---|---|---|---|
| 2013/0325473 | A1 | 12/2013 | Larcher |
| 2013/0343641 | A1 | 12/2013 | Mnih et al. |
| 2014/0142929 | A1* | 5/2014 | Seide ............... G06N 3/08 704/202 |
| 2014/0156575 | A1 | 6/2014 | Sainath et al. |
| 2014/0257804 | A1* | 9/2014 | Li ............... G10L 15/16 704/232 |
| 2014/0372112 | A1 | 12/2014 | Xue et al. |
| 2015/0066499 | A1 | 3/2015 | Wang et al. |
| 2015/0100530 | A1 | 4/2015 | Mnih et al. |

OTHER PUBLICATIONS

Rybach et al "Direct Construction of Compact Context-Dependency Transducers from Data" Interspeech 2010 ISCA, 2010.*
Chou "Optimal Partitioning for Classification and Regression Trees", IEEE Trans. on Pattern Analysis and Machine Intelligence, vol. 13 No. 4, Apr. 1991.*
Hinton et al "Deep Neural Networks for Acoustic Modeling in Speech Recognition" IEEE Signal Processing Magazine vol. 29, No. 6 2012.*
Rumelhart et al "Learning representations by back-propagating errors" Nature vol. 323, Oct. 9, 1986.*
Aronowitz et al., "New developments in voice biometrics for user Authentication," in Interspeech, Aug. 2011, pp. 17-20.
Aronowitz, "Text-dependent speaker verification using a small development set," in Proc. Odyssey Speaker and Language Recognition Workshop, 2012, 28 pages.
Auckenthaler et al., "Score normalization for text-independent speaker verification systems," Digital Signal Processing, 10: 42-54, 2000.
Bennani et al., "Connectionist approaches for automatic speaker recognition," in ESCA Workshop on Automatic Speaker Recognition, Identification and Verification, 1990, 265-268.
Coates and Ng, "The importance of encoding versus training with sparse coding and vector quantization," in Proceedings of the 28th International Conference on Machine Learning (ICML-11), Jun. 2011, pp. 921-928.
Dahl et al., "Improving deep neural networks for LVCSR using rectified linear units and dropout," in Proc. ICASSP, 2013, 5 pages.
Dehak et al., "Front-end factor analysis for speaker verification," IEEE Transactions on Audio, Speech, and Language Processing, 19: 788-798, 2011.
Donahue et al. "Decaf: A deep convolutional activation feature for generic visual recognition." arXiv preprint arXiv:1310.1531 (2013).
Finan et al., "Comparison of multilayer and radial basis function neural networks for text-dependent speaker recognition," Neural Networks, 1996, IEEE International Conference on. vol. 4. IEEE, 1996, pp. 1992-1997.
Garimella et al., "Factor analysis of auto-associative neural networks with application in speaker verification," IEEE transactions on neural networks and learning systems 24(4):522-528. Apr. 2013.
Goodfellow et al., "Maxout networks," in Proc. JMLR, 2013, 1319-1327.
Hassibi et al., "Second order derivatives for network pruning: Optimal brain surgeon," in Advances in Neural Information Processing Systems 5, 1993, pp. 164-171.
Hinton et al., "Improving neural networks by preventing co-adaptation of feature detectors," in arXive preprint, 2012, 1-18.
Jarrett et al., "What is the best multi-stage architecture for object recognition?" in ICCV. IEEE, 2009, pp. 2146-2153.
Kenny et al., "A study of interspeaker variability in speaker verification," IEEE Transactions on Audio, Speech, and Language Processing, 16: 980-988, 2008.
Kenny et al., "Joint Factor Analysis versus Eigenchannels in Speaker Recognition," IEEE Transactions on Audio, Speech, and Language Processing, 15: 1435-1447, 2007.
Kenny et al., "Speaker and session variability in GMM-based speaker verification," IEEE Transactions on Audio, Speech, and Language Processing, 15: 1448-1460, 2007.
Kenny, "Bayesian speaker verification with heavy-tailed priors," in Proc. Odyssey Speaker and Language Recognition Workshop, 2010, 10 pages.
Kinnunen et al., "Real-time speaker identification and verification," IEEE Transactions on Audio, Speech and Language Processing, Jan. 1, 2006, 14(1):277-288.
Larcher et al. "Phonetically-constrained PLDA modeling for text-dependent speaker verification with multiple short utterances," in Proc. ICASSP, May 26-31, 2013, 7673-7677.
LeCun et al., "Gradient-based learning applied to document recognition," Proceedings of the IEEE, vol. 86, No. 11, pp. 2278-2324, Nov. 1998.
LeCun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, pp. II-97-104.
Lee et al.," Unsupervised feature learning for audio classification using convolutional deep belief networks," in NIPS, 2009, pp. 1096-1104.
Lei et al., "Application of convolutional neural networks to language identification in noisy conditions," in Proc. Speaker Odyssey Workshop (submitted), 2014, 6 pages.
McLaren et al., "Application of convolutional neural networks to speaker recognition in noisy conditions," in 15th Annual Conference of the International Speech Communication Association, Sep. 2014, pp. 686-690.
Mohamed et al., "Deep Belief Networks for phone recognition," ICASSP, 2011, pp. 1-9.
Nair et al., "Rectified linear units improve restricted Boltzmann machines," in ICML, 2010, 8 pages.
Office Action issued in U.S. Appl. No. 14/228,469 on Nov. 4, 2015, 21 pages.
Oglesby et al., "Optimisation of neural models for speaker identification," in Proc. ICASSP, Apr. 3-6, 1990, 1:261-264.
Pennlio, "Fully-connected, locally-connected and shared weights layer in neural networks," Peng's Blog, Apr. 11, 2014 [retrieved on Sep. 8, 2015]. Retrieved from the Internet: URL<https://pennlio.wordpress.com/?s=fully-connected%2C+locally-connected>, 4 pages.
Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.
Reynolds et al., "Speaker Verification Using Adapted Gaussian Mixture Models," Digital Signal Processing 10, 19-41 (2000).
Sainath et al., "Deep convolutional neural networks for LVSCR," in Acoustics, Speech and Signal Processing (ICASSP), 2013 IEEE International Conference on. IEEE, 2013, pp. 8614-8618.
Schalkwyk et al., ""your word is my command": Google search by voice: A case study," in Advances in Speech Recognition, Springer, Aug. 2010, pp. 61-90.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL<http://ufldl.stanford.edu/tutorial/supervised/ConvolutionalNeuralNetwork/>, 2 pages.
Vanhoucke et al., "Improving the speed of neural networks on CPUs," in Deep Learning and Unsupervised Feature Learning Workshop, NIPS 2011, 2011; pp. 1-8.
Variani et al., "Deep neural networks for small footprint text-dependent speaker verification," in Acoustics, Speech and Signal Processing (ICASSP), 2014 IEEE International Conference on. IEEE, May 2014, pp. 4080-4084.

(56) References Cited

OTHER PUBLICATIONS

Vasilakakis et al., "Speaker recognition by means of deep belief networks." (2013). (Published Oct. 2013; Presented on Oct. 14-15, 2013), 7 pages.
Yegnanarayana et al., "AANN: an alternative to GMM for pattern recognition," Neural Networks, 15(3):459-469, 2002.
Yu et al., "Exploiting Sparseness in Deep Neural Networks for Large Vocabulary Speech Recognition," in ICASSP 2012. IEEE SPS, Mar. 2012, pp. 4409-4412.
Chou, "Optimal partitioning for classification and regression trees," IEEE Trans. on Pattern Analysis and Machine Intelligence, vol. 13, No. 4, pp. 340-354, Apr. 1991.
Dean et al., "Large Scale Distributed Deep Networks," Proc. Neural Information Processing Systems, pp. 1232-1240, Dec. 2012.
Mohri et al., "Weighted Finite-State Transducers in Speech Recognition," Computer Speech and Language, vol. 16, issue 1, pp. 69-88, Jan. 2002.
Rybach et al., "Direct construction of compact context-dependency transducers from data," Computer Speech and Language, vol. 28, issue 1, pp. 177-191, Jan. 2014.

\* cited by examiner

CONTEXT-DEPENDENT STATE TYING USING A NEURAL NETWORK

CROSS REFERENCE TO RELATED APPLICATION

This application claims priority to U.S. provisional application 61/899,085, filed on Nov. 1, 2013, the entire content of which is incorporated herein by reference.

FIELD

This specification describes technologies related to neural networks.

BACKGROUND

Automatic speech recognition is an important technology that can be used in mobile devices and other devices. In general, automatic speech recognition attempts to provide accurate transcriptions of what a person has said.

SUMMARY

In one aspect, this disclosure features a method that includes receiving an audio signal encoding a portion of an utterance, and providing, to a first neural network, data corresponding to the audio signal. The method also includes generating, by a processor, data representing a transcription for the utterance based on an output of the first neural network. The first neural network is trained using features of multiple context-dependent states, the context-dependent states being derived from a plurality of context-independent states provided by a second neural network.

In another aspect, the disclosure features a system that includes a speech recognition engine that includes a processor. The speech recognition engine is configured to receive an audio signal encoding a portion of an utterance, and generate data representing a transcription for the utterance based on an output of a first neural network. The first neural network is configured to accept data corresponding to the audio signal as input. The first neural network is trained using features of multiple context-dependent states, the context-dependent states being derived from a plurality of context-independent states provided by a second neural network.

In another aspect, the disclosure features a non-transitory computer readable storage device encoding one or more computer readable instructions, which upon execution by one or more processors cause various operations. Operations include receiving an audio signal encoding a portion of an utterance, and providing, to a first neural network, data corresponding to the audio signal. Operations also include generating data representing a transcription for the utterance based on an output of the first neural network. The first neural network is trained using features of multiple context-dependent states, the context-dependent states being derived from a plurality of context-independent states provided by a second neural network.

Implementations of the above aspects can include one or more of the following.

The second neural network can be trained using vectors of acoustic data representing features of utterances. The features can include one or more phonemes. The second neural network can be trained by assigning labels representing the context-independent states to the vectors of acoustic data. The multiple context-dependent states can be derived from the plurality of context-independent states using one or more decision trees. At a given parent node of the one or more decision trees, a training frame corresponding to a context independent state can be assigned to one of a plurality of context dependent child nodes. The multiple context-dependent states can be derived from the plurality of context-independent states using divisive, likelihood-based K-means clustering.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
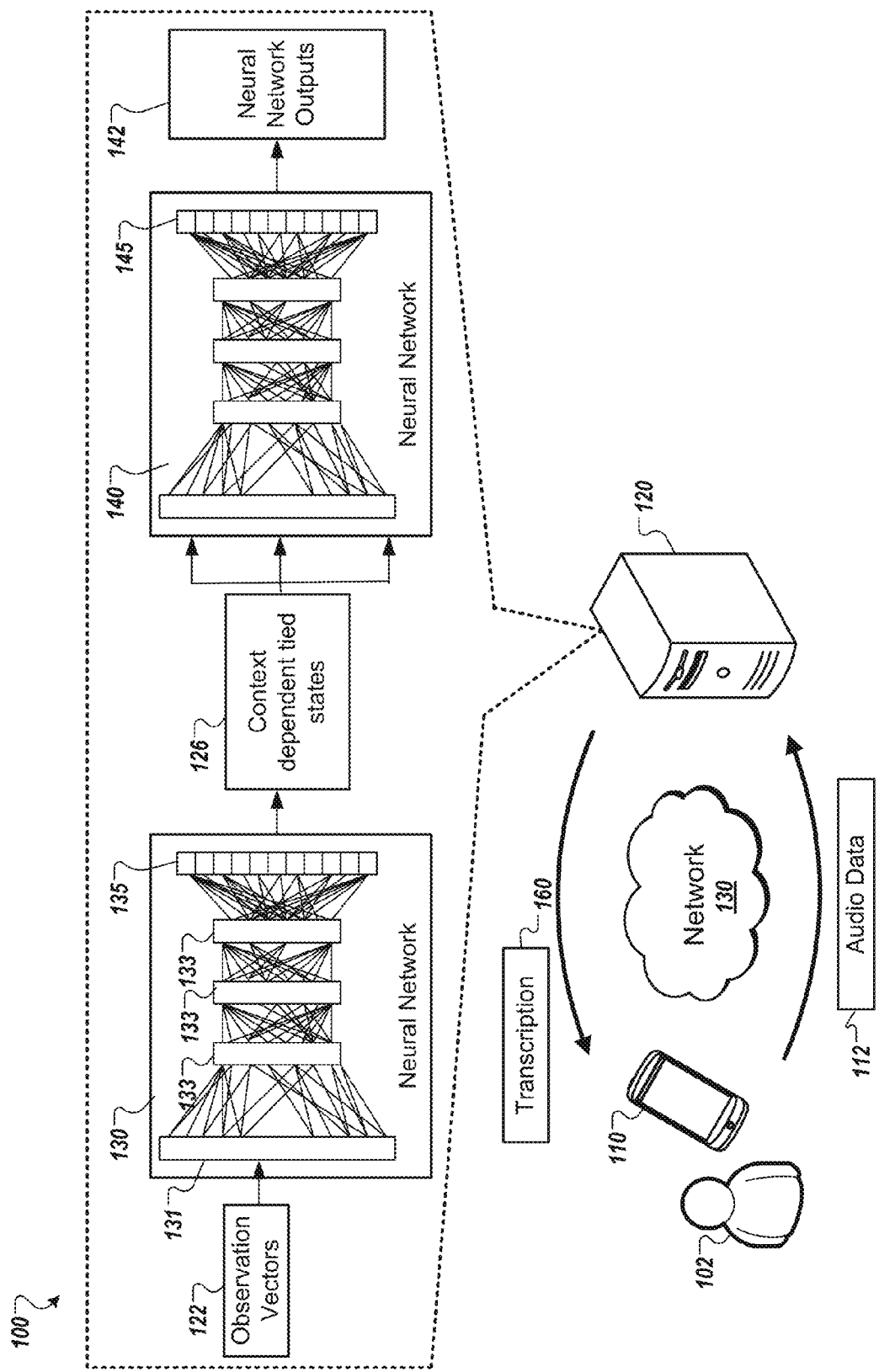
FIG. 1 is a block diagram that illustrates an example of a system for speech recognition using neural networks.

Neural networks can be used, for example, in an acoustic model of a speech recognition system. In such a speech recognition system, a context-dependent (CD) phoneme model can be developed from context independent phonemes via a process often referred to as state-tying. In some conventional neural network based speech recognition systems, the state-tying is performed by first defining a Gaussian mixture model (GMM) to model the emission probabilities of an underlying Hidden Markov Model (HMM), and then training a neural network based on the tied states. However, this requires an infrastructure that supports both neural networks as well as GMM/HMM, and such a system is therefore often referred to as a hybrid neural network system. In some implementations, the technology described in this document can allow for optimizing state tying on the activation vectors of a neural network directly. For example, an initial neural network can be trained using a set of acoustic observation vectors to extract features used in the state-tying process. Another neural network can then be trained based on the tied states. Therefore, rather than relying on a GMM/HMM system (that operates on a different feature space and requires additional infrastructural support), a purely neural network based infrastructure can be used to implement a speech recognition system.

As described above, a hybrid neural network system relies on a GMM/HMM to allow training of the network. In situations where the training uses a cross entropy (CE) objective, the acoustic observations of the training set are associated with state identities of the underlying HMMs. To derive such labels, a fully trained GMM/HMM system is used to force align the training material. In some cases, a process known as sequence training may replace the frame-based CE objective with one that optimizes the discriminative sequence based metrics commonly used in GMM/HMM systems. Examples of such metrics can include maximum mutual information (MMI), minimum phone error (MPE), or segmental minimum Bayes risk (sMBR). This way, knowledge from a GMM/HMM model can be used, at least to some extent, in a neural network framework. In such cases, alignment statistics computed with the neural network can be used to guide the network optimization. However, even with sequence training, a dependence on a GMM/HMM system cannot be completely avoided because the neural network is trained to predict probabilities (typically via decision-tree clustering) of a tied state inventory that is based on the GMM/HMM system Gaussian CD state tying uses the acoustic observations that are used in a GMM/HMM system, which are typically different from the feature representation used in a neural network-based system. For example, GMM/HMM systems typically use perceptual linear predictive (PLP) features, whereas a neural network based system can use log filterbank energies. Furthermore, decisions on which phonetic contexts to tie in the tied-state inventory are based on how well the grouped phonetic contexts are modeled jointly by a Gaussian distribution. Therefore, in a hybrid system, the tied-state definition used in the neural network is constructed on a mismatched feature set using a mismatched model family.

The technology described in this document allows for designing the tied-state inventory using activations of an a priori trained context independent neural network. As such, the process is directly matched to the features and modeling that are employed in a neural network, and does not rely on a mismatched GMM/HMM system and distinct feature representation. Furthermore, since the state inventory is defined post hoc, the process can be configured to be adaptive to changes in the state inventory. In some implementations, decision tree-based clustering can be used to define the tied state set, which in turn may assist in integrating the process with the recognition search during testing. In some implementations, a tied-state set construction process can be used for a network optimized with a CE criterion. In some implementations (for example, when used with sequence training, and a CE network initialization for sequence training is not needed), a dependence on GMM/HMM system can be avoided.

FIG. 1 illustrates an example of a system 100 for speech recognition using neural networks. The system 100 includes a client device 110, a computing device 120, and a network 130. In the system 100, a user 102 speaks an utterance into the client device 110, which generates an audio signal 112 encoding the utterance. The client device 110 provides the audio signal 112 about the user 102 and/or the client device 110 to the computing device 120 via the network 130. The computing device 120 then processes the audio signal 112, and provides an input to a neural network 140. The computing device 120 uses output 142 from the neural network 140 to identify a candidate transcription 160 for the utterance, which may then be transmitted back to the client device 110.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing device 120 can be performed by individual computer systems or can be distributed across multiple computer systems. The network 130 can be wired or wireless or a combination of both and can include the Internet.

In operation, a user 102 of the client device 110 initiates a speech recognition session such that the client device encodes an audio signal that includes speech of the user. The user may, for example, press a button on the client device 110 before speaking, speak an utterance, and then release the button on the client device 110. As another example, the client device 110 could be in a hands-free listening mode, i.e., the user would not have to initiate a voice input request in order for the speech recognizer to become active. In another example, the user may select a user interface control on the client device 110 before speaking the utterance. The client device 110 encodes the utterance into an audio signal 112, which may be, for example, a snippet of relatively high quality audio, such as 16 kHz lossless audio.

For privacy protection, any historical, behavioral or other data gathered can be obtained on an optional basis. Gathered data can be anonymized by various means. Search history data can be anonymized for privacy protection, so that the data, if compromised, cannot be associated with a particular user or user identifier. Various anonymization processes, such as hashing, encryption and obfuscation techniques, can be used to ensure that subject privacy is protected.

Upon encoding the audio signal, the client device 110 transmits the audio signal 112 to the computing device 120 over the network 130. The computing device 120 receives the audio signal 112 and obtains information about acoustic features of the audio signal 112. For example, the computing device 120 may generate a set of feature vectors, where each feature vector indicates audio characteristics during a different portion or window of the audio signal 112. Each feature vector may indicate acoustic properties of, for example, a 10 millisecond (ms), 25 ms, or 50 ms portion of the audio signal 112. During run time, for example, when performing automatic speech recognition (ASR), the computing device 120 can process the audio signal 112 to obtain transcription data 160 for the same, using one or more neural networks.

During a training phase of the neural networks, the audio signal 112 can be provided from a corpus of training data, which the computing device 120 can break down into the observation vectors 122. The computing device 120 can also be used to implement a neural network 130 that can be used for feature extraction and state-tying. In some implementations, the neural network 130 includes an input layer 131 to which the acoustic observation vectors 122 are presented. The input layer 131 can be connected with trainable weights to a stack of hidden layers 133 and an output layer 135 (which may also be referred to as a softmax layer). The hidden layers 133 can be configured to compute weighted sums of the activation vectors received from the connections and a bias, and output activation vectors based on a nonlinear function applied to the sums. In some implementations, the output softmax layer 135 can be configured to produce network output for N classes, wherein the n-th class probability for the t-th acoustic input observation vector x(t) is defined as:

$$P(n \mid x(t)) = \frac{\exp(w_n^T a(t) + b_n)}{\sum_{i=1}^{N} \exp(w_i^T a(t) + b_i)}, \quad (1)$$

where $w_n$ denotes the weight vector associated with the output neuron of the neural network 130 for the n-th class, $b_n$ denotes the bias of that neuron, a(t) denotes the activation output from the final hidden layer (i.e., the one connected as an input to the softmax layer 135) for the t-th input pattern and $[.]^T$ denotes a transposition.

In some implementations, to initialize the process, a network topology is defined for the input layer 131 and the hidden layers 133. An initial softmax layer 135 is defined for N Context Independent (CI) states. The neural network 130 is then trained on the training set. In some implementations, for CE training, the observation vectors 122 of the training set are labeled with CI state labels. For example, the label for the t-th frame may be denoted as l(t).

In some implementations, two or more context independent states can be grouped together to produce an inventory of CD states 126. This is referred to as state-tying. In some implementations, the state tying process includes computing activation vectors for all training set frames using the trained CI network from the initialization described above. For example, the quantity a(t) can be computed from equation (1) for all t in the training set.

In some implementations, $c=\{c_1, \ldots, c_L\}$ denotes an L symbol context. For example, for a triphone system, L is equal to 2, and $c_1$ encodes the left and $c_2$ encodes the right context. Furthermore, by having c(t) denote the context for the t-th observation and $c_p(t)$ denote the p-th symbol in that context, $\phi(n; p; s)$ can be defined as: $\phi(n; p; s)=\{a(t):l(t)=n$ and $c_p(t)=s\}$, and is the set of all activation vectors for CI state n that have symbol s in the p-th context position.

In some implementations, decision trees can be constructed using various techniques, including, for example, the technique described in the publication: P. Chou, "Optimal partitioning for classification and regression trees," *IEEE Trans. on Pattern Analysis and Machine Intelligence*, vol. 13, no. 4, pp. 340-354, 1991, the content of which is hereby incorporated by reference. For example, starting from a single node tree for each CI state n, leaf nodes that have the largest likelihood gain under a Gaussian model are greedily split. Potential new left and right child nodes can be defined by a Gaussian distribution such that any leaf in the tree is characterized, for example, by a Gaussian centroid model. The system can be made efficient by assuming a Gaussian distribution for the activation vectors, because such an assumption allows the use of sufficient statistics to implement the process. Potential splits can be evaluated by partitioning the activation vectors in a parent node into left and right child sets and computing the likelihood gain from modeling the activation vectors in the left/right child partitioning (rather than, for example, jointly using the parent distribution).

Partitioning the activation frames in a node of the tree for phone state n may assign the frames for a particular context symbol s in a particular context position p to either the left or right child. Therefore, the activation vectors $\phi(n; p; s)$ can be assigned to either the left or right child, and cannot be divided in the assignment. Likelihood of such hypothesized partitioning can be computed to assess the gain of a hypothesized split. The constraint that any $\phi(n; p; s)$ is assigned to a single child can mean that a resulting hypothesized split can be expressed as a set symbol set question on a particular context position p.

In some implementations, the gain and definition of a hypothesized context position split can be computed jointly using, for example, binary divisive, likelihood-based K-means clustering. The set of activation vectors for a given context symbol s in position p (i.e., $\phi(n; p; s)$) is assigned to either the right or left child based on the larger Gaussian likelihood of that data under the left or right child distribution. Once the activation vector sets are partitioned, the Gaussian centroid for the left and right child can be re-estimated in a maximum likelihood sense and the process can be iterated until a predetermined convergence is reached. Treating the activation vector sets for a given context symbol s as atomic (i.e., further indivisible), the K-means clustering process may compute the likelihood gain as well as the partitioning that produces that gain. In some implementation, the process can be configured to consider the partitioning of any leaf in any tree on any context position and greedily implement the split with the largest gain. The newly formed children can then be greedily evaluated for their best split parameters and the process can be iterated until no further leaf splits that lead to a likelihood gain can be found.

Therefore, in the process described above, the splits are evaluated on the activation vectors that feed into the final softmax layer, and not based on features that are mismatched with the neural network. Further, in some implementations, a clustering algorithm can be used to define the context sets, rather than using any pre-defined context sets. Because such clustering is performed on the output of one or more layers of non-linearity, a data driven design of the set questions may be implemented.

In some implementations, when using decision tree clustering, the trees can be pruned back using a gain threshold to a desired state set size. To allow use of the tied state inventory in recognition experiments, the pruned trees can be compiled into a context dependency transducer. This can be done, for example, using the splitting part of the algorithm described in the publication: D. Rybach, M. Riley, and C. Alberti, "Direct construction of compact context-dependency transducers from data," *Computer Speech and Language*, vol. 28, pp. 177-191, the entire content of which is incorporated herein by reference. In some implementations, for the leaves of the trees, the Gaussian centroid can provide an estimate of the mean activation vectors of frames that are assigned to the CD tied states 126.

In some implementations, the computing device 120 uses the CD tied states 126 to train the neural network 140. The acoustic observations x(t) (which may be represented by the observation vectors 122) of the training set can be mapped to the new tied state inventory. For example, if an observation was previously labeled as CI state n, the observation is mapped to the tied CD state by mapping the observation using the tree for n and looking up the leaf corresponding to c(t).

The neural network 140 can be initialized by expanding the number of neurons in the softmax layer 145 to the new CD state inventory size. In some implementations, the weights going into the neuron can be set to the mean activation.

In some implementations, the parameters for the hidden layer can be retained from the initialization stage. In such cases, training the neural network 140 can be limited to only the softmax layer 145. In some implementations, the training can include additional, or even all other weights in the neural network 140. Because the tied state inventory is designed based on similarity of the activation vectors, they can be matched to the weight estimates of the hidden layers, which in some cases, may be optimized for the CI state inventory.

The neural network 140 can therefore be trained to act as an acoustic model. For example, while performing run-time ASR, the trained neural network 140 can indicate likelihoods that feature vectors correspond to different speech units when the feature vectors are provided to the neural network 140. While performing run-time ASR, the neural network 140 can produce neural network outputs 142, which the computing device 120 can use to identify a transcription 160 for the audio signal 112. For example, the computing device 120 may provide the neural network outputs 142 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 160 may be derived. The computing device 120 then provides the transcription 160 to the client device 110 over the network 130.

Figure 2:
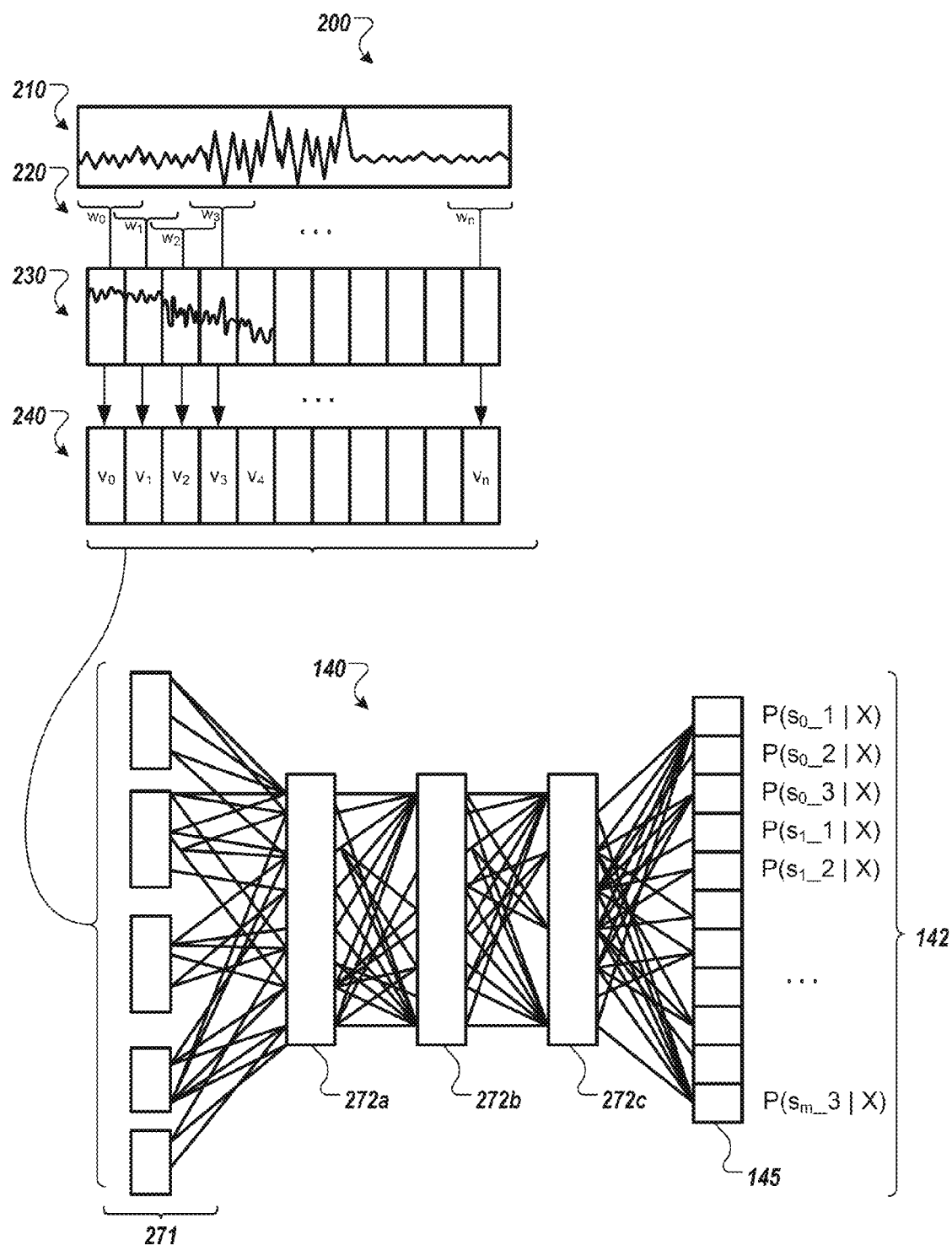
FIG. 2 is a diagram that illustrates an example of processing for speech recognition using neural networks.

FIG. 2 is a diagram 200 that illustrates an example of run-time processing for speech recognition using neural networks. The operations discussed are described as being performed by the computing device 120, but may be performed by other systems, including combinations of multiple computing devices.

The computing device 120 receives data about an audio signal 210 that includes speech to be recognized. The computing device 120 or another system then performs feature extraction on the audio signal 210. For example, the computing device 120 analyzes different segments or analysis windows 220 of the audio signal 210. In some implementations, the feature extraction may be performed using a neural network such as the neural network 130. Data representing the windows 220 can be included in the observation vectors 122 described above with reference to FIG. 1. In some implementations, each window may correspond to a phoneme. The windows 220 can be labeled $w_0 \ldots w_n$, and as illustrated, the windows 220 can overlap. For example, each window 220 may include 25 ms of the audio signal 210, and a new window 220 may begin every 10 ms. For example, the window 220 labeled $w_0$ may represent the portion of audio signal 210 from a start time of 0 ms to an end time of 25 ms, and the next window 220, labeled $w_1$, may represent the portion of audio signal from a start time of 10 ms to an end time of 35 ms. In this manner, each window 220 includes 15 ms of the audio signal 210 that is included in the previous window 220.

The computing device 120 can be configured to perform a Fast Fourier Transform (FFT) on the audio in each window 220. The results of the FFT are shown as time-frequency representations 230 of the audio in each window 220. From the FFT data for a window 220, the computing device 120 extracts features that are represented as an acoustic feature vector 240 for the window 220. The acoustic features may be determined by binning, for example, according to filter-bank energy coefficients, using a mel-frequency cepstral coefficient (MFCC) transform, or using other techniques. In some implementations, the logarithm of the energy in each of various bands of the FFT may be used to determine acoustic features.

The acoustic feature vectors 240, labeled $v_1 \ldots v_n$, include values corresponding to each of multiple dimensions. Each acoustic feature vector 240 represents characteristics of the portion of the audio signal 210 within its corresponding window 220. The computing device 120 uses the neural network 140 as an acoustic model to indicate likelihoods that inputs (i.e., the acoustic feature vectors) to the network 140 represent different phonetic units (or phonemes). The neural network 140 includes an input layer 271, a number of hidden layers 272a-272c, and the output layer 145 (referenced above in FIG. 1). The neural network 140 can be configured to receive one or more of the feature vectors as inputs, and trained to estimate likelihoods that particular phonetic units are present within the inputs.

At the output layer 145, the neural network 140 indicates likelihoods that the speech in a given window under analysis (e.g., the window $w_1$ corresponding to a particular CD state) corresponds to specific phonetic units. In some implementations, the phonetic units used are phonemes or components of phonemes. In the example, the potential phonemes are referred to as $s_0 \ldots s_m$. The phonemes may be any of the various phonemes in speech, such as an "ah" phoneme, an "ae" phoneme, a "zh" phoneme, and so on. The phonemes $s_0 \ldots s_m$ may include all of the possible phonemes that may occur in the audio signal 210, or fewer than all of the phonemes that may occur.

The output layer 145 provides outputs 142 in the form of predictions or probabilities of acoustic states given the data at the input layer 271. The output layer 145 can provide a value, for each state of each phone that indicates the probability that the acoustic feature vector $v_1$ represents the particular state of the particular phone. For example, for a first phone, $s_0$, the output layer 145 can provide a first value that indicates a probability $P(s_0\_1|X)$, which indicates a probability that the window $w_1$ includes the first acoustic state of the $s_0$ phone, given the set of input, X, provided at the input layer 271. For a first phone, $s_1$, the output layer 145 can provide a second value indicating a probability $P(s_0\_2|X)$, indicating a probability that the window $w_1$ includes the second acoustic state of the $s_0$ phone, given the set of input, X, provided at the input layer 271. Similar outputs 142 can be provided for all states of all of the phones $s_0 \ldots s_m$.

In some implementations, the output of the neural network 140 can be provided to a set of weighted finite state transducers that represents a language model composed with a lexicon, and a grammar. The set of weighted finite state transducers can approximate an HMM. The weighted finite state transducers output a word lattice that the computing device 120 can use to determine a transcription for the audio signal.

As indicated above, each output from the neural network 140 can include a posterior probability P(state|X), representing a likelihood of a particular acoustic state given the current set of input data, X. In some implementations, the computing device 120 divides the posterior, P(state|X) by the prior, P(state), to generate a scaled posterior probability for each output. The resulting scaled posterior probabilities are then input to the weighted finite state transducers for further processing.

Figure 3:
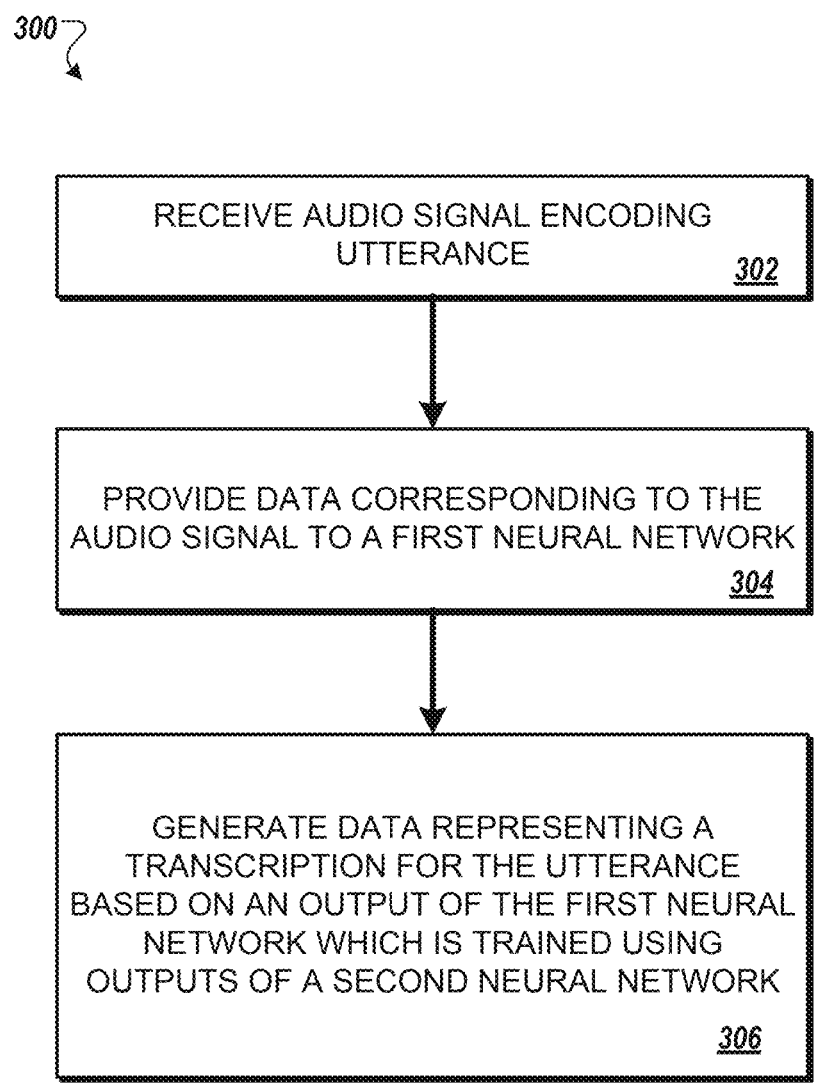
FIG. 3 is a flow diagram that illustrates an example of a process for speech recognition using neural networks.

FIG. 3 shows an example of a process 300 for speech recognition using neural networks. One or more or the operations associated with the process 300 can be carried out in a computing device, for example, the computing device 120 described above with reference to FIG. 1. The process 300 includes receiving an audio signal encoding utterance of a human speaker (302). The process also includes providing data corresponding to the audio signal to a first neural network (304). The first neural network, which is trained and initialized earlier, generates data representing a transcription for the utterance (306).

During a training phase, the first neural network can be trained using the outputs of a second neural network. For example, the training vectors used for training the first neural network can be mapped to multiple CD states derived from a plurality of CI states provided at the output of the second neural network. The second neural network can be trained using vectors of acoustic data representing features of utterances such as CI phonemes. During a corresponding training phase of the second neural network, the vectors of training data are assigned labels that represent the CI phonemes. The CD states used in training the first neural network can be obtained, for example, by using a decision tree process on the CI states provided by the second neural network.

Figure 4:
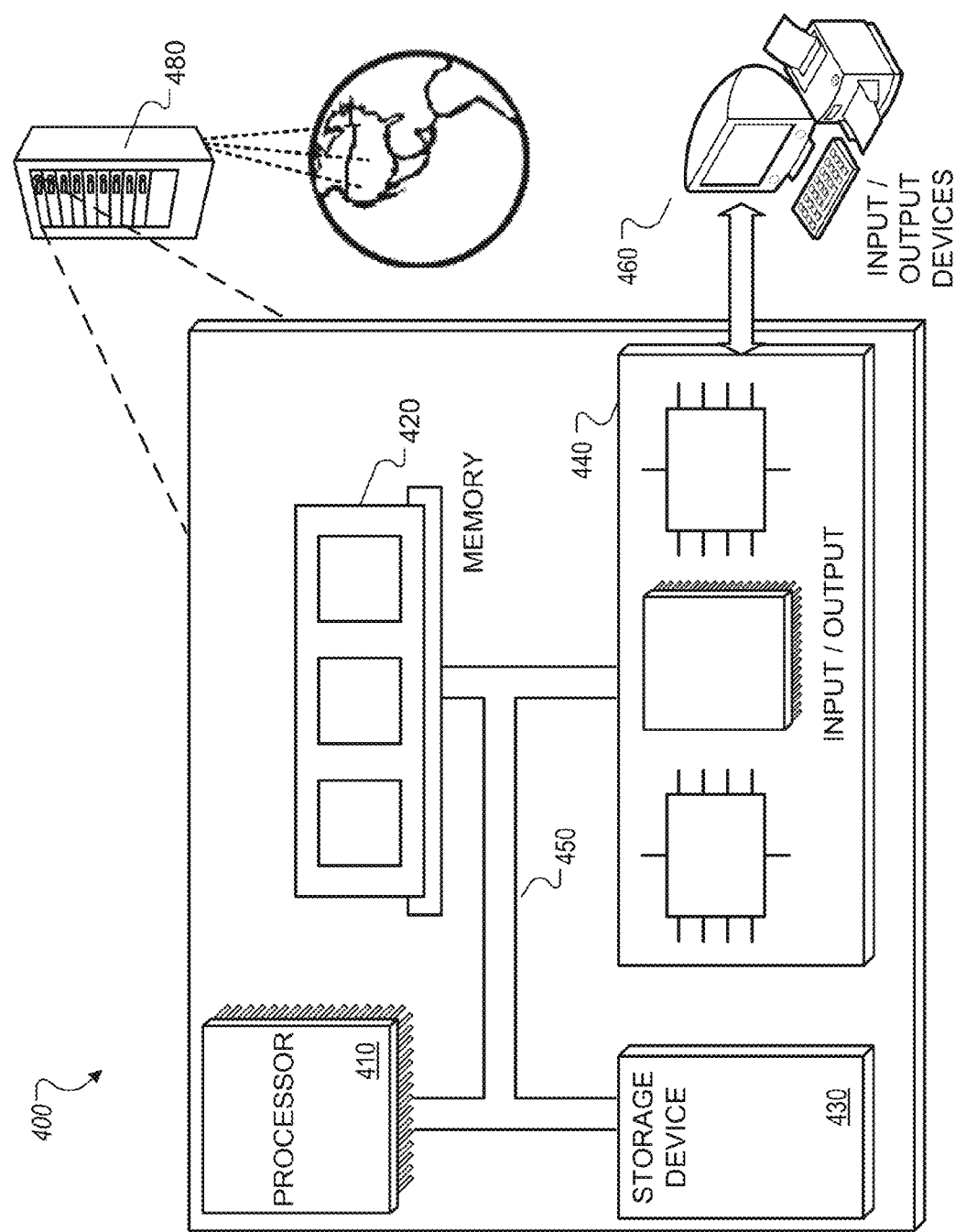
FIG. 4 is a block diagram of an example of a computing device.

FIG. 4 is block diagram of an example computer system 400 that may be used in performing the processes described herein. For example, the computing device 120 described above with reference to FIG. 1, can include at least portions of the computing device 400 described below. Computing device 400 is intended to represent various forms of digital computers, such as laptops, desktops, workstations, servers, blade servers, mainframes, and other appropriate computers. Computing device 400 is further intended to represent various typically non-mobile devices, such as televisions or other electronic devices with one or more processers embedded therein or attached thereto. Computing device 400 also represents mobile devices, such as personal digital assistants, touchscreen tablet devices, e-readers, cellular telephones, smartphones.

The system 400 includes a processor 410, a memory 420, a storage device 430, and an input/output module 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output module 440 provides input/output operations for the system 400. In one implementation, the input/output module 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460.

The web server, advertisement server, and impression allocation module can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Example computer system 400 can include a server. Various servers, which may act in concert to perform the processes described herein, may be at different geographic locations, as shown in the figure. The processes described herein may be implemented on such a server or on multiple such servers. As shown, the servers may be provided at a single location or located at various places throughout the globe. The servers may coordinate their operation in order to provide the capabilities to implement the processes.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a non-transitory computer-readable medium, for execution by, or to control the operation of, a processing system. The non-transitory computer readable medium can be a machine readable storage device, a machine readable storage substrate, a memory device, or a combination of one or more of them.

In this regard, various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Content, such as ads and GUIs, generated according to the processes described herein may be displayed on a computer peripheral (e.g., a monitor) associated with a computer. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems and methods discussed here collect personal information about users, or may make use of personal information, the users may be provided with an opportunity to control whether programs or features that may collect personal information (e.g., information about a user's calendar, social network, social actions or activities, a user's preferences, or a user's current location), or to control whether and/or how to receive content that may be more relevant to (or likely to be clicked on by) the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected (and/or used) about him or her.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

EXAMPLES

The technology described in this document is further illustrated using the following examples, which are not intended to limit the scope of the claims.

Experiments were conducted on a database of mobile speech recordings originating from a number of Android applications: voice search, translation and the voice-based input method. These recordings were anonymized, i.e., only the speech recording was retained and all information indicative of the source of the data was removed. The training set included a sampling of about 3 million utterances containing about 2000 hours of speech. Manual transcriptions were obtained for these utterances. Evaluation was performed on a test set that included data sampled uniformly from all applications emphasizing the use frequency of each application. This test set included about 23000 utterances, or about 20 hours of speech.

First, a CI GMM/HMM system was trained using a 42 phone inventory. Each phone was modeled with a 3-state left-to-right HMM giving the CI system a 126 state inventory. Training started out with a flat start and followed with incremental mixture training. State distributions in the final system were modeled with Gaussian mixtures of up to 64 components. The CI GMM/HMM system was then used to force align the training set, labeling the acoustic observations in the training set with CI state labels.

For the initial neural network, 40 dimensional log filter-bank energy features were computed at a rate of 100 frames per second. These frames were stacked with a context window of 20 frames to the left and 5 frames to the right. The resulting training set representation is about 680 million observations of 1040-dimensional vectors with associated CI state labels. In addition, the triphone context for each observation was computed, i.e. for each training frame the left and right neighboring phone label were encoded. The value of the parameter L was set to 2 and the parameter c was defined to encode the triphone context.

The initial neural network having seven fully connected hidden layers of 2560 neurons each was then trained. The softmax output layer had 126 outputs, one for each CI state label. For the hidden layers rectified linear units (ReLU) nonlinearities we used. The initial neural network was trained using a distributed deep network training infrastructure, using asynchronous gradient descent with a fixed 0.003 learning rate and training steps (minibatch updates) of 200 frames. The training process is also described in the publication J. Dean, G. Corrado, R. Monga, K. Chen, M. Devin, Q. Le, M. Mao, M. Ranzato, A. Senior, P. Tucker, K. Yang, and A. Ng, "Large Scale Distributed Deep Networks," *Proc. Neural Information Processing Systems,* 2012, the content of which is incorporated herein by reference. The network was trained for about 22 million steps (about 4.4 B training frames or about 6.5 epochs). The averaged entropy loss over the training process is depicted in FIG. 5.

In addition to tracking the training CE loss, a word error rate (WER) evaluation was performed on the test set on intermediate network estimates. The system used in each of these evaluations used a vocabulary of about 2.5 million words and a trigram language model with about 33 million ngrams. The language model and lexicon (and in case of a CD system, the context dependency definition) were combined into a single decoding graph using the approach described in the publication: M. Mohri, F. Pereira, and M. Riley, "Weighted Finite-State Transducers in Speech Recognition," *Computer Speech and Language*, vol. 16, pp. 69-88, 2002, the content of which is incorporated herein by reference.

Figure 5:
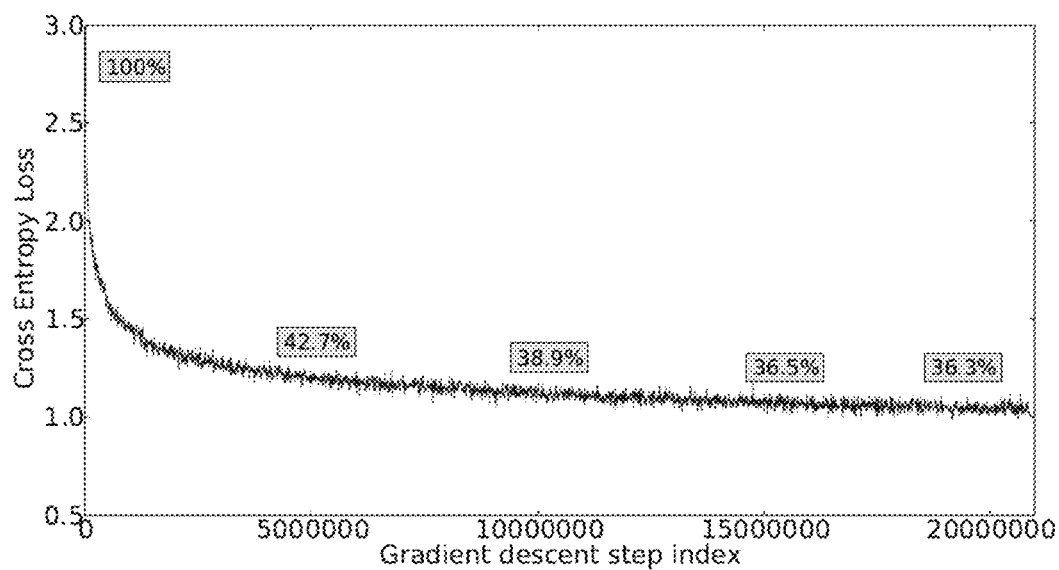
FIGS. 5-9 are plots illustrating various examples related to the technology described in this document.

FIG. 5 also shows the WER measurements of the network at different stages in the training process. The CI error rate of the converged network was found to be 36.3%. Training the network up to that point using 100, 4-way partitioned model replicas to parallelize the training took about 95 hours. A total of 2560-dimensional activation vectors were computed for the 680 million training frames from the 7-th hidden layer of the initial network. Gaussian statistics of those activation vectors for any observed CI state in unique context were derived. A total of 103518 unique statistics accumulators (CI state label in context) were found (silence states were modeled context independently). These statistics were then used to perform the likelihood based clustering described above.

Figure 6:
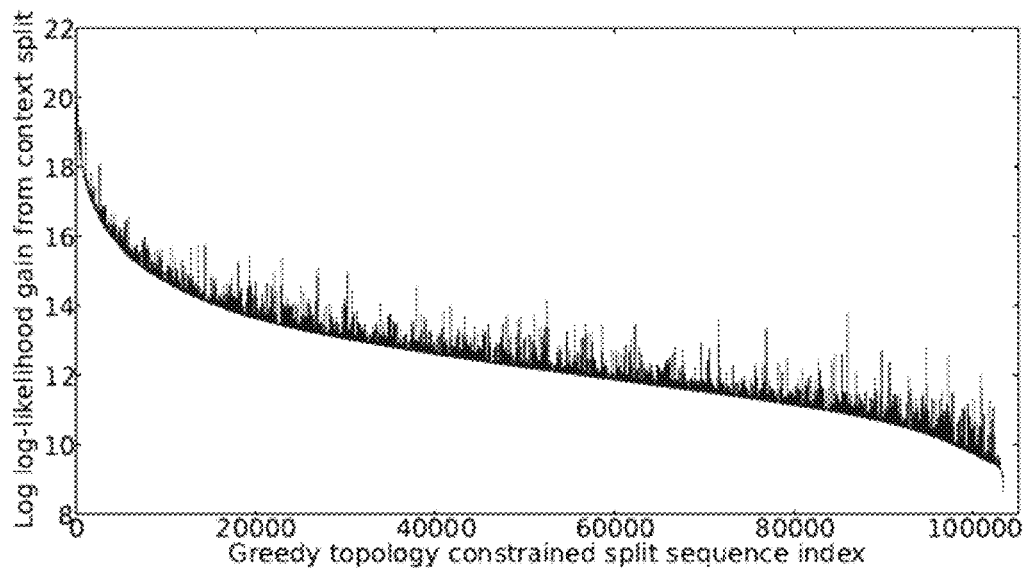

FIG. 6 shows the log-likelihood gains (on a double log scale) of successive greedy splits. The plot shown in FIG. 6 is not monotonically decreasing as tree topology constraints were taken into account (i.e., a child can have a larger split gain than its parent, but that gain can only be implemented if the parent is split first). Because the activation vectors used in clustering are used after application of various non-linearities, there is no guarantee that phones with phonetically similar production properties have similar activation patterns. However, observing some of the frequent context questions that were inferred by the data driven clustering algorithm certain phone groups (for example, nasals en n nx) were observed.

The trees were then pruned back to create state inventories of 400, 800, 2000, 4000, 8000, 12000 and 15000 tied states. Neural networks retaining the hidden layer weights from the initial network but with mutated softmax layers were constructed for the state clustering defined by the pruned trees. These networks were then trained for 15 million (200 frame mini batch) training steps. In the training only the weights and biases of the softmax layer were optimized, whereas the hidden layer weights were kept fixed. The CE loss evolution of these networks through the training process and periodic WER evaluation are depicted in FIG. 7.

Figure 7:
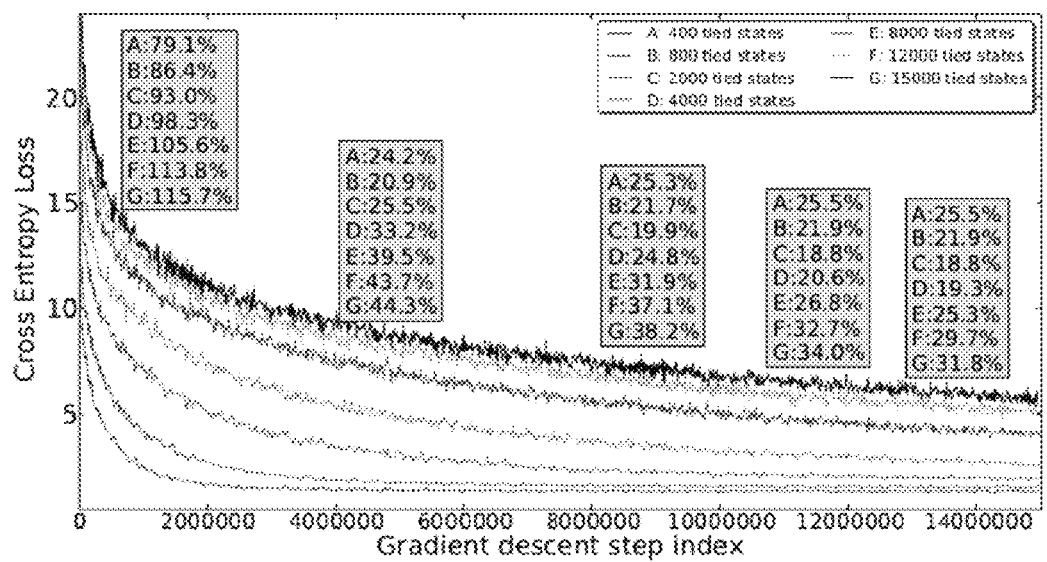

In the example shown in FIG. 7, the centroid mean initialization of the softmax weights appeared to be a poor choice because the initial CE loss was large. The training reduced the metric and WER measurements, therefore illustrating that the tied state systems gain over the CI system when trained for 15 million steps. The smaller state inventory systems converge more quickly. The best WER of 18.8% (a 48% WER reduction compared to the CI system) was obtained using the 2000 state inventory system.

It was unclear if the larger systems performed poorly due to a lack of convergence or if the activation vectors feeding into the softmax layer were sub-optimal. Because the hidden layers were frozen in this example, the softmax of any of these systems operated on the same activations.

Figure 8:
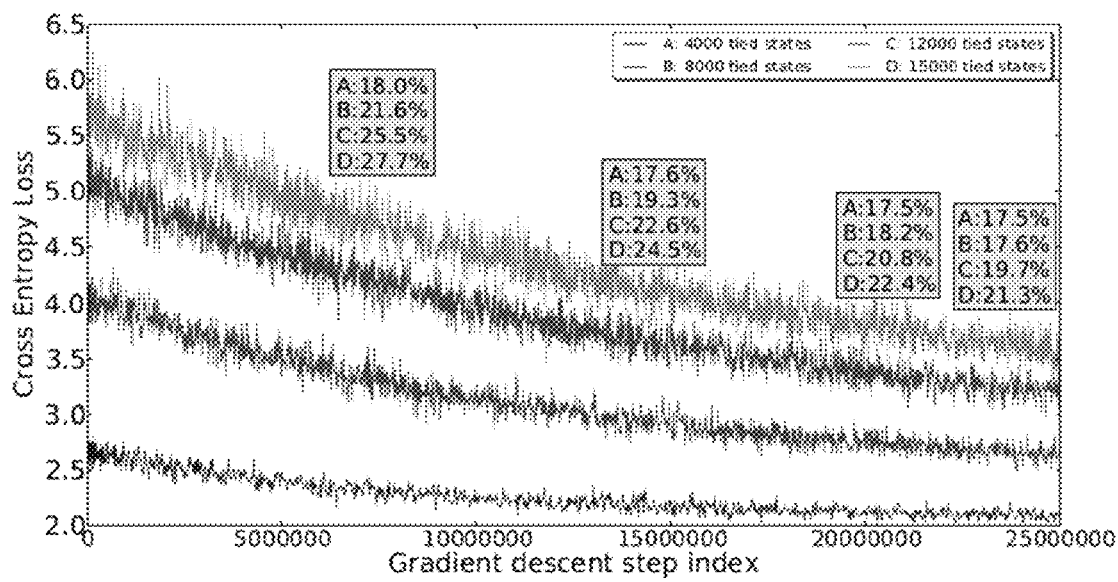
Figure 9:
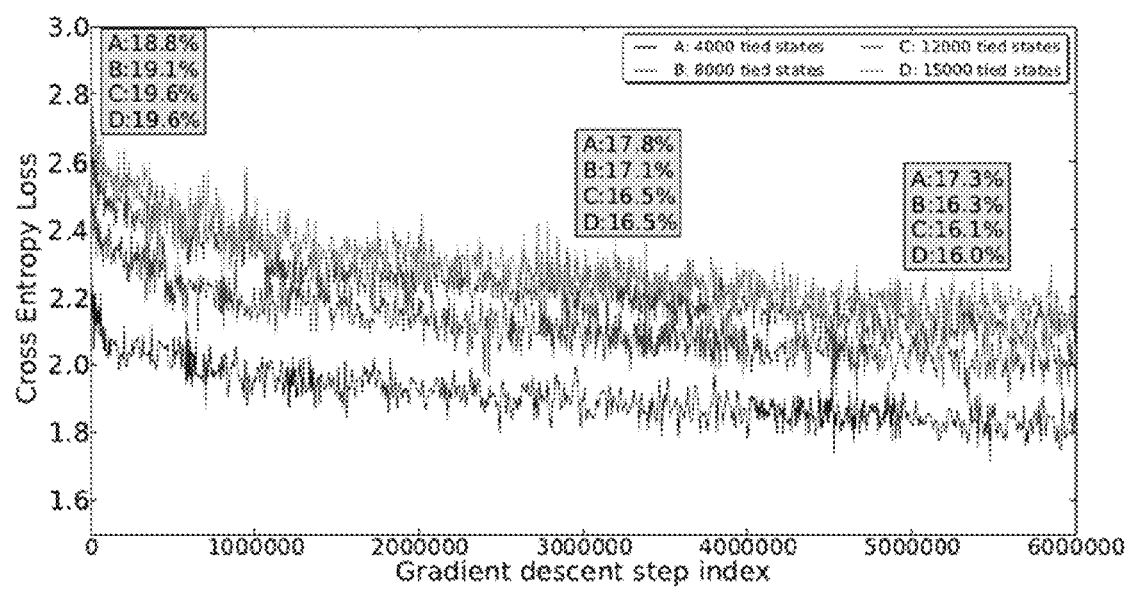

To investigate further, the networks were trained for the 4000 or larger state inventories, updating either the softmax layer weights only or allowing weights in the network to be trained jointly. The CE loss evolution and WER measurements of the softmax only updates are depicted in FIG. 8. The training evolutions for the runs that updated all network weights are depicted in FIG. 9.

The network training that allowed the hidden layer weights to be updated outperformed the network training that only allowed softmax layer updates. The additional gain was more pronounced for the larger networks. The 15000 state network reached a word error rate of 16.0%.

In the examples above, the state inventory tying was optimized on the activation vectors of the context independent trained system. For smaller state inventory networks, this presented a reasonable feature space. Creating a larger state inventory resulted in WER reductions (e.g., 25.5% for the 400 state system vs. 21.9% for the 800 state system). Further, on comparing the subsequent constrained, softmax only, optimization with the joint optimization of all weights of the network, the smaller networks were shown to have insignificant performance difference (e.g. the 4000 state system achieved 17.6% vs. 17.3% for larger state inventory system). For larger state inventories, the CI activation vectors appeared less well suited. WER reduction were noted for increased inventory sizes, but the constrained vs. joint training showed larger WER differences (e.g. 21.3% vs. 16.0% for the 15000 state system).

The proposed algorithm for tied state inventory design was better matched to the neural network model as it directly optimized the inventory based on the features and model family. Dependency on an external, mismatched GMM/HMM system was reduced. However, a CI GMM/HMM system was relied upon for the labeling of the input frames. Furthermore, the alignment of that system was fixed for the above examples, thereby limiting the ability of the training to optimize for string WER. For comparison, when training a 15000 state CD GMM/HMM system from the same CI system starting point, force aligning the training data to label the frames with the CD state labels and training a DNN with the same topology resulted in a 14.5% WER.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations may fall within the scope of the following claims.

What is claimed is:

1. A method performed by one or more computers, the method comprising:
   accessing, by the one or more computers, a first neural network that has been trained using speech data examples that are each assigned a context-dependent state by clustering context independent states based on activations at a hidden layer of a second neural network that was trained to provide outputs corresponding to context-independent states, the first neural network being configured to provide outputs corresponding to one or more context-dependent states;
   receiving, by the one or more computers, an audio signal encoding a portion of an utterance;
   providing, by the one or more computers, data corresponding to the audio signal to the first neural network that has been trained using the speech data examples that are each assigned a context-dependent state based on the activations at the hidden layer of the second neural network;
   generating, by the one or more computers, data indicating a transcription for the utterance based on an output of the first neural network that was generated in response to the data corresponding to the audio signal; and providing, by the one or more computers, the data indicating the transcription as output of an automated speech recognition service.

2. The method of claim 1,
wherein the second neural network is trained using vectors of acoustic data representing features of utterances.

3. The method of claim 2, wherein the features include one or more phonemes.

4. The method of claim 1, wherein the first neural network has been trained to provide outputs corresponding to multiple context-dependent states that are derived from a plurality of context-independent states using one or more decision trees.

5. The method of claim 4, wherein at a given parent node of the one or more decision trees, a training frame corresponding to a context-independent state is assigned to one of a plurality of context-dependent child nodes.

6. The method of claim 4, wherein the multiple context-dependent states are derived from the plurality of context-independent states using divisive, likelihood-based K-means clustering.

7. The method of claim 1,
wherein the method further comprises training the first neural network to provide outputs corresponding to context-dependent states after initializing the first neural network with parameter values from the second neural network trained to provide outputs corresponding to context-independent states.

8. The method of claim 1, wherein the second neural network has been trained to indicate context-independent states corresponding to speech examples;
wherein the method further comprises:
using the second neural network to determine an activation vector for each of multiple speech examples, the activation vector for each speech sample indicating the activations produced at a hidden layer of the second neural network in response to inputting data about the speech sample to the second neural network;
assigning a context-dependent state to each of the multiple speech examples based on the activation vector for the speech sample; and
training the first neural network using the multiple speech examples and the context-dependent states assigned based on the activation vectors.

9. The method of claim 1, further comprising deriving the first neural network from the second neural network by:
retaining hidden layers of the second neural network and parameters of the hidden layers of the second neural network;
replacing an output layer of the second neural network that provides outputs corresponding to context-independent states with an expanded output layer; and
training the expanded output layer to provide outputs corresponding to context-dependent states.

10. The method of claim 9, wherein training the expanded output layer comprises adjusting parameters of the expanded output layer while maintaining the parameters of the hidden layers of the second neural network.

11. A system comprising
a speech recognition engine comprising one or more processors and a machine-readable storage device storing instructions that, when executed by the one or more processors, cause the one or more processors to perform operations comprising:

accessing, by the one or more computers, a first neural network that has been trained using speech examples that are each assigned a context-dependent state by clustering context independent states based on activations at a hidden layer of a second neural network that was trained to provide outputs corresponding to context-independent states, the first neural network being configured to provide outputs corresponding to one or more context-dependent states;

receiving, by the one or more computers, an audio signal encoding a portion of an utterance;

providing, by the one or more computers, data corresponding to the audio signal to the first neural network that has been trained using the speech examples that are each assigned a context-dependent state based on the activations at the hidden layer of the second neural network;

generating, by the one or more computers, data indicating a transcription for the utterance based on an output of the first neural network that was generated in response to the data corresponding to the audio signal; and providing, by the one or more computers, the data indicating the transcription as output of an automated speech recognition service.

12. The system of claim 11,
wherein the second neural network is trained using vectors of acoustic data representing features of utterances.

13. The system of claim 12, wherein the features include one or more phonemes.

14. The system of claim 11, wherein the first neural network has been trained to provide outputs corresponding to multiple context-dependent states that are derived from a plurality of context-independent states using one or more decision trees.

15. The system of claim 14, wherein at a given parent node of the one or more decision trees, a training frame corresponding to a context-independent state is assigned to one of a plurality of context-dependent child nodes.

16. The system of claim 14, wherein the multiple context-dependent states are derived from the plurality of context-independent states using divisive, likelihood-based K-means clustering.

17. A non-transitory computer-readable storage device encoding one or more computer-readable instructions, which upon execution by one or more processors cause operations comprising:
accessing, by the one or more computers, a first neural network that has been trained using speech examples that are each assigned a context-dependent state by clustering context independent states based on activations at a hidden layer of a second neural network that was trained to provide outputs corresponding to context-independent states, the first neural network being configured to provide outputs corresponding to one or more context-dependent states;

receiving, by the one or more computers, an audio signal encoding a portion of an utterance;

providing, by the one or more computers, data corresponding to the audio signal to the first neural network that has been trained using the speech examples that are each assigned a context-dependent state based on the activations at the hidden layer of the second neural network;

generating, by the one or more computers, data indicating a transcription for the utterance based on an output of the first neural network that was generated in response to the data corresponding to the audio signal; and providing, by the one or more computers, the data indicating the transcription as output of an automated speech recognition service.

18. The computer readable storage device of claim 17, wherein the second neural network is trained using vectors of acoustic data representing features of utterances.

19. The computer readable storage device of claim 18, wherein the features include one or more phonemes.

* * * * *